United States Patent
Allan (10) Patent No.: US 9,992,271 B2
(45) Date of Patent: Jun. 5, 2018

(54) ENF SELECTION FOR NFVI

(71) Applicant: Telefonaktiebolaget L M Ericsson (publ), Stockholm (SE)

(72) Inventor: David Ian Allan, San Jose, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 392 days.

(21) Appl. No.: 14/557,246

(22) Filed: Dec. 1, 2014

(65) Prior Publication Data

US 2016/0156718 A1 Jun. 2, 2016

(51) Int. Cl.
- *H04L 29/08* (2006.01)
- *H04L 29/12* (2006.01)
- *H04L 12/46* (2006.01)

(52) U.S. Cl.
CPC .......... *H04L 67/10* (2013.01); *H04L 12/4633* (2013.01); *H04L 2012/4629* (2013.01)

(58) Field of Classification Search
CPC ..................................................... H04L 67/141
See application file for complete search history.

(56) References Cited

U.S. PATENT DOCUMENTS

| | | | |
|---|---|---|---|
| 9,160,666 B2 | 10/2015 | Allan et al. | |
| 2006/0245439 A1* | 11/2006 | Sajassi | H04L 12/2881 370/400 |
| 2007/0076607 A1* | 4/2007 | Voit | H04L 61/2015 370/230 |
| 2012/0307830 A1* | 12/2012 | DelRegno | H04M 7/006 370/400 |
| 2013/0266007 A1* | 10/2013 | Kumbhare | H04L 45/56 370/389 |
| 2014/0133330 A1* | 5/2014 | Chapman | H04L 41/0806 370/252 |
| 2014/0172947 A1* | 6/2014 | Ghai | H04L 65/102 709/202 |
| 2014/0201374 A1* | 7/2014 | Ashwood-Smith | H04L 49/70 709/226 |
| 2014/0233387 A1* | 8/2014 | Zheng | H04L 67/1034 370/235 |

FOREIGN PATENT DOCUMENTS

WO 2005069562 A1 7/2005

OTHER PUBLICATIONS

"GPON-fed TR-101 Ethernet Access Node", TR-167 Issue 1, The Broadband Forum, Feb. 2010, pp. 1-30.

(Continued)

*Primary Examiner* — Nicholas Taylor
*Assistant Examiner* — Sanjoy Roy
(74) *Attorney, Agent, or Firm* — NDWE, LLP (57) ABSTRACT

A method and system implemented by a computing device to establish a session between a residential gateway and a virtual edge network function (vENF) in a network function virtualization infrastructure (NFVI) over an access network where a plurality of residential gateways are connected to the access network through a plurality of access nodes that tunnel edge network function requests to the NFVI via a NFVI gateway the broadcasts initial service requests to a plurality of VENF in the NFVI. The method defines a process for a vENF to self-select to service an initial service session request from the residential gateway.

14 Claims, 10 Drawing Sheets

(56) References Cited

OTHER PUBLICATIONS

"Media Access Control (MAC) Bridges and Virtual Bridged Local Area Networks", IEEE Standard for Local and Metropolitan Area Networks, IEEE Std 802.1Q™, 2012 Edition, 1782 pages.
"Using GPON Access in the Context of TR-101", TR-156 Issue 1, The Broadband Forum, Dec. 2008, 50 pages.
"Virtual Bridged Local Area Networks Amendment 4: Provider Bridges," IEEE Standard for Local and Metropolitan Area Networks, IEEE Std 802.1ad 2005, May 2006, 74 pages.
"Multi-service Broadband Network Architecture and Nodal Requirements", TR-178 Issue 1, The Broadband Forum, Sep. 2014, pp. 1-97.
"Network Functions Virtualization End-to-End Architecture", GS NFV-0010, V0.1.6, ETSI, Aug. 2013, 24 pages.
"Network Functions Virtualisation Infrastructure Architecture; Use Cases", GS NFV INF 002, V0.3.2, Nov. 22, 2013, 38 pages.
"Network Functions Virtualization NFV", ETSI GS NFV-INF 001, V1.1.1, Oct. 2013, 50 pages.
Braden, R., "T/TCP—TCP Extensions for Transactions Functional Specification", Network Working Group, Request for Comments: 1644, (Jul. 1994), 38 pages.
Braden, R., "Towards a Transport Service for Transaction Processing Applications", Network Working Group, Request for Comments: 955, (Sep. 1985), 10 pages.
Information Sciences Institute, University of Southern California, et al., "Transmission control protocol darpa internet program protocol specification", Sep. 1981, RFC: 793, 91 pages.
Rosen, E., et al., "Multiprotocol Label Switching Architecture", RFC 3031, Standards Track, Jan. 2001, pp. 1-61, http://www.ietf.org/rfc/rfc3031.txt.
Socolofsky, T., et al., "A TCP/IP Tutorial", Network Working Group; RFC 1180; Jan. 1991; 28 pages.
"Migration to Ethernet-Based Broadband Aggregation", Broadband Forum; TR-101—Jul. 2011; 101 pages.
"Network function Virtualization (NFV) Management and Orchestration", GS NFV-Man 001 V0.8.1; Nov. 2014; 189 pages.
Allan, David, et al., "Proposed text for section 4 of WT=345", BBForum 2014.0769.01; Sep. 2014; 3 pages.
Allan, David, et al., "Proposed text for WT-345 on Scope and Architecture", BBForum 2014.0480.02; Sep. 2014; 4 pages.
Allan, David, "The Edge Edge", BBF contribution 2014.770.00; 5 pages.

* cited by examiner

ENF SELECTION FOR NFVI

FIELD

Embodiments of the invention relate to the field of network function virtual infrastructure (NFVI). Specifically, embodiments relate to a process by which one or more of a set of virtual edge network functions (vENFs) self-selects the data traffic to service from a set of residential gateways where the data traffic is tunneled across the access network to the NFVI.

BACKGROUND

Network functions virtualization (NFV) is a network architecture concept that implements specific functions or entire classes of network device functions as building blocks that may be connected, or chained, together to create communication services. These functions are implemented in a virtualized software environment that enables their distribution to and execution on commodity hardware deployed within a network.

NFV relies upon, but differs from, traditional server virtualization techniques such as those used in enterprise level software. A virtualized network function, or VNF, may be implemented via one or more virtual machines running different software and processes, on top of standard network device or server architectures, such as switches and storage systems, or even in a cloud computing infrastructure, instead of having custom hardware appliances for each network function.

The European Telecommunications Standards Institute (ETSI) has developed an NFV initiative that defines a number of use cases that pertain to virtualization of functions currently specified by the Broadband Forum (BBF), such that they can be deployed on commodity infrastructure. The NFV initiative describes basics of use cases pertaining to two nodes/platforms, the residential gateways (RGs) and broadband network gateways (BNGs), amongst the other cases.

The particular cases of RGs and BNGs imposes some new challenges in the design of the VNFs and access to the virtualization infrastructure in order to preserve existing protocols and procedures while permitting the benefits of virtualization to be applied to service delivery. From the point of view of access, this has to do with scale out of what used to be a monolithic network side termination of the access network.

BBF Technical Report (TR)-101 is a proposal based on 802.1ad (QinQ) with extensions. This proposal defines a manner of establishing a session across the access network that supports a multiple tagging models upstream from an access node. The proposal also supports multiple tagging models on customer drops. TR-101 originally focused on digital subscriber line (DSL) access and Ethernet aggregation but has been extended to support passive optical network access (TR-156 & TR-167) and multi-protocol label switching (MPLS) aggregation (TR-178). However all of these recommendations assumed a monolithic border network gateway (BNG) from a single vendor. The decomposition of the BNG function into virtualized network functions and deployment in NFVI significantly alters the scale equation and introduces new challenges as to how load is distributed.

SUMMARY

A method is implemented by a computing device to establish a communications session between a residential gateway and a virtual edge network function (vENF) in a network function virtualization infrastructure (NFVI) over an access network where a plurality of residential gateways are connected to the access network through a plurality of access nodes that tunnel edge network function requests to the NFVI via a NFVI gateway that broadcasts initial service requests to a plurality of vENF in the NFVI. The vENF self-selects to service an initial service session request from the residential gateway. The method includes receiving the initial service session request from the NFVI gateway via a broadcast domain or emulation of a broadcast domain, and determining via criteria received as part of the service session request that the vENF is a candidate to service the session. The method further includes sending a service session request response to the residential gateway identifying an address of the vENF to service the session, and exchanging data traffic with the residential gateway over the session between the gateway and the vENF upon completion of session establishment confirmation.

A computing device implementing a residential gateway is configured to establish a communication session between the residential gateway and a vENF in an NFVI over an access network where a plurality of residential gateways are connected to the access network through a plurality of access nodes that tunnel edge network function requests to the NFVI via a NFVI gateway that broadcasts initial service requests to a plurality of vENFs in the NFVI. The vENF self-selects to service an initial service session request from the residential gateway. The computing device includes a non-transitory machine-readable medium having stored therein instructions for at least one virtual machine and at least one vENF and a processor coupled to the non-transitory machine-readable medium. The processor is configured to execute the virtual machine, the at least one virtual machine configured to execute the at least one vENF. The vENF is configured to receive the initial service session request from the NFVI gateway via a broadcast domain or emulation of a broadcast domain, to determine via criteria received as part of the service session request that the vENF is a candidate to service the session; to send a service session request response to the residential gateway identifying an address of the vENF to service the session, to exchange data traffic with the residential gateway over the session between the gateway and the vENF upon completion of session establishment confirmation.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

The following description describes methods and apparatus for establishing a communications session between a residential gateway and a virtual edge network function (VENF) in a network function virtualization infrastructure (NFVI) over an access network where a plurality of residential gateways are connected to the access network through a plurality of access nodes that tunnel edge network function requests to the NFVI via a NFVI gateway that broadcasts initial service requests to a plurality of vENF in the NFVI. One or more vENFs self-selects to service an initial service request from the residential gateway and manipulates information returned to the residential gateway (RG) as part of session initiation such that subsequent session traffic is directed to the self-selected vENF. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The following acronyms are used herein and a provided here for sake of convenience and convenience. The acronyms or abbreviations include: AN—Access Node; BBF—Broadband Forum; DA—Destination Address; DHCP—Dynamic Host Configuration Protocol; DSL—Digital Subscriber Loop; EMS—Element Management System; ENF—Edge Network Function; ENFI—ENF instance; IPoE—IP over Ethernet; MPLS—Multi-Protocol Label Switching; MS-BNG—Multi-Service BNG; NFV—Network Function Virtualization; NFVI—NFV Infrastructure; NPIF—New Project Initiation Form; OAM—Operations, Administration, Maintenance; PADI—PPPoE Active Discovery Initiation; PADO—PPPoE Active Discovery Offer; PON—Passive Optical Network; PPP—Point to Point Protocol; PPPoE—PPP over Ethernet; PW—Pseudo Wire; RADIUS—Remote Authentication Dial In User Service; RG—Residential Gateway; SA—Source Address; TLS—transport layer security; TR—Technical Report; vENF—virtual ENF; VNF—Virtual Network Function; VNFM—VNF Manager; VPN—Virtual Private Network; VRRP—Virtual Router Redundancy Protocol; and WT—Working Text Overview The embodiments of the invention describe a method and system for distributing load generated by a BBF TR-101/156/167/178 access network across a set of virtualized edge network functions (vENF) in a form that minimizes infrastructure provisioning, and works across all defined access protocol suites, and VLAN tagging modes in the aforementioned specifications. The prior art does not offer any load distribution process or mechanism that is applicable to this infrastructure. In particular, there are no load distribution systems or methods that do not require protocol suite awareness and/or additional provisioning points in the NFVI and/or at the NFVI/WAN boundary, as well as specific behaviors for different TR-101 tagging options. The embodiments provided herein have the most desirable operational properties as well as implementation simplicity.

In comparison with the prior art, what used to be a single platform/network side termination that served a large number of customers has been decomposed into a large number of network side terminations in the form of edge network functions (ENFs) implemented in commodity computer servers as virtualized ENFs, i.e. vENFs. To implement these vENFs in the NFVI requires a mechanism for fanning out the incoming traffic to the vENFs and establishing connections between the vENFs and resident gateways (RGs) where requests for services are originating. How this fan out inside the NFVI occurs can be achieved in a number of ways, but there are many protocols and procedures already operationalized that need to be carried forward and supported in this NFVI implementation.

The embodiments support BBF TRs including TR-101, TR-156, TR-167, and TR-178. In particular, the embodiments of the invention confine awareness of the TR-101 tagging options used and access protocol suite used to the ENF. The invention does not require coordination of scale up or scale down of the number of ENF instances, or any aspect of an ENF instance life cycle with the NFVI gateway (NFVI GW).

TR-101/156/167/178 defines support for two access protocol suites: PPPoE and IPoE. In addition, two modes of VLAN tagging are supported: 1:1 and N:1 VLAN tagging. The embodiments are designed to confine the differences in protocol and tag handling to the ENF, served by a common implementation in the MS-BNG and NFVI-GW. In this regard, the embodiments relay only on existing behavior of MS-BNG to use S-tag cross connect as specified in TR-178. This is applicable for 1:1, N:1 and TLS.

The proposal TR-101 defines a matrix that define a set of tags to be used in the embodiments described herein below:

| Connectivity model AN←→BNG | ELINE 1:1 single tag | ELINE 1:1 double tag | ETREE N:1 | ELAN (access segment) TLS |
|---|---|---|---|---|
| Untagged or priority tagged | S-tag identifies service & port, S-tag can be inferred from ethertype | S-tag identifies service, S-tag can be inferred from ethertype C-tag identifies customer port | S-tag identifies service, S-tag can be inferred from ethertype | S-tag identifies service |
| C-tagged | S-tag identifies service & port, S-tag is inferred from C-tag | S-tag identifies service, S-tag is inferred from C-tag. An imposed C-tag identifies port | S-tag identifies service, S-tag is inferred from C-tag. | S-tag identifies service, S-tag can be inferred from C-tag |

The embodiments provide a method and system that operates irrespective of the tagging mode, as described in further detail herein below with respect to the example embodiments, the NFVI-GW maps a received S-tag to a broadcast domain in the NFVI, where the broadcast domain or similar emulation of a broadcast domain has the NFVI-GW and set of vENFs as the attached "ports." In one example embodiment, the broadcast domain is implemented as an Open Stack Neutron network. As a result of the use of the broadcast domain all vENFs see the initial control messages broadcast by the RGs. Such initial control messages, or initial service request messages, can be DHCP discover or PPPoE PADI where both are implemented as a L2 broadcast from the NFVI GW to the set of vENFs. The vENFs have been programmed by the VNFM and/or EMS as to which subscribers and/or range of subscribers they should provide service to, which is discerned by the vENFs on the basis of C-tags for 1:1 VLAN for IPoE and PPPoE, on the basis of option 82 information for N:1 VLAN with IPoE, on the basis of Circuit ID and Remote ID tag for PPPoE PADI, or similar tags or facility information. One or more vENFs may "offer" a DHCP lease/PPPoE termination to the subscriber or similarly offer to service the incoming service session requests. These offers also provides sufficient information that subsequent traffic flows related to the service request will be unicast between the RG and the vENF.

The embodiments provide a number of advantages. The embodiments work regardless of the number of media access control (MAC) end points at the premises, aggregate traffic and steer aggregated traffic to a unique vENF on the basis of identified facility (circuit ID or C-tag). The methods and system of the embodiments can also instantiate a NAT instance per customer drop in the vENF and therefore can handle overlapping Internet Protocol (IP) address ranges in the access network. The embodiments provide common implementation and provisioning at both the MS-BNG and NFVI-GW irrespective of a tagging model or protocol suite. The embodiments enable common implementation and provisioning ton be utilized for both the MS-BNG and NFVI-GW for both TR-178 and BBF WT-317/328. This technique also has the desirable property that all traffic associated with an individual subscriber facility will be directed to a single vENF which greatly simplifies operations, administration and management (OAM) procedures, authentication, authorization and accounting (AAA), and the handling of aggregate traffic contracts for the access facility.

The embodiments support routed RG, network enabled RG, and virtual business gateways. For both PPPoE and DHCP, procedures are already defined for the client to arbitrate between multiple offers. Thus, the embodiments do not have to ensure a single vENF offers only that at least one vENF offers an initial service request but would have to ensure that once a vENF had self-selected for a given subscriber access facility, it is desirable that it exclusively service any subsequent requests for that subscriber. Therefore, in some embodiments it may be preferable to avoid multiple offers and potentially multiple vENFs serving clients of a bridged RG. This is a vENF implementation matter and does not affect the NFVI architecture.

In some embodiments, the relationship of a vENF to a subscriber drop is not specified, the relationship can be 1:1, N:1 or similarly organized. Thus, the embodiments support a VM (i.e., a vENF) per subscriber or alternatively the embodiments support multiple subscribers per VM. The embodiments do not restrict the manner that the self-selection process could be coordinated between the set of vENFs. This self-selection does not have to be a pre-defined static mapping of ownership. For example, all vENFs do not need to be equal (i.e., have identical functionality or load). The embodiments could encompass a common vENF/DHCP server that acted as a load balancer for IPoE. In addition, vENFs could simply be a DHCP relay to a central load balancing agent. The vENFs can also participate in reporting current load levels/resource availability and similar metrics for use in load balancing.

The embodiments are compatible with and method of scale up and/or scale down. Similarly, the embodiments can be utilized in conjunction with any protocols that would facilitate resiliency. For example, the embodiments can be utilized in combination with virtual router redundancy protocol (VRRP) for fast failover of a mirrored vENF. Also, the embodiments are compatible with protocols that facilitate operational procedures. For example, internet control message protocol (ICMP) re-direct can be utilized to quiesce a session on a given vENF by directing all or a subset of one vENF's traffic to another vENF.

The embodiments support security protocols and procedures. Circuit IDs & Remote IDs, audio-video protocol (AVP), DHCP Option 82, and access node imposed C-tags are all provider administered values that do not exist outside the provider access network. These protocols and related data is imposed and/or removed at the access node. There is no room for malicious or incompetent abuse of the vENF selection process by subscribers. A TR-101i2 access node will police source address & destination MACs received on the "U" interface. Once a session is established, a subscriber cannot direct traffic to a vENF other than the serving vENF. The number of MAC addresses learned on a subscriber port can be capped. Similarly the rate of session initiation requests can be limited by an access node.

Figure 1:
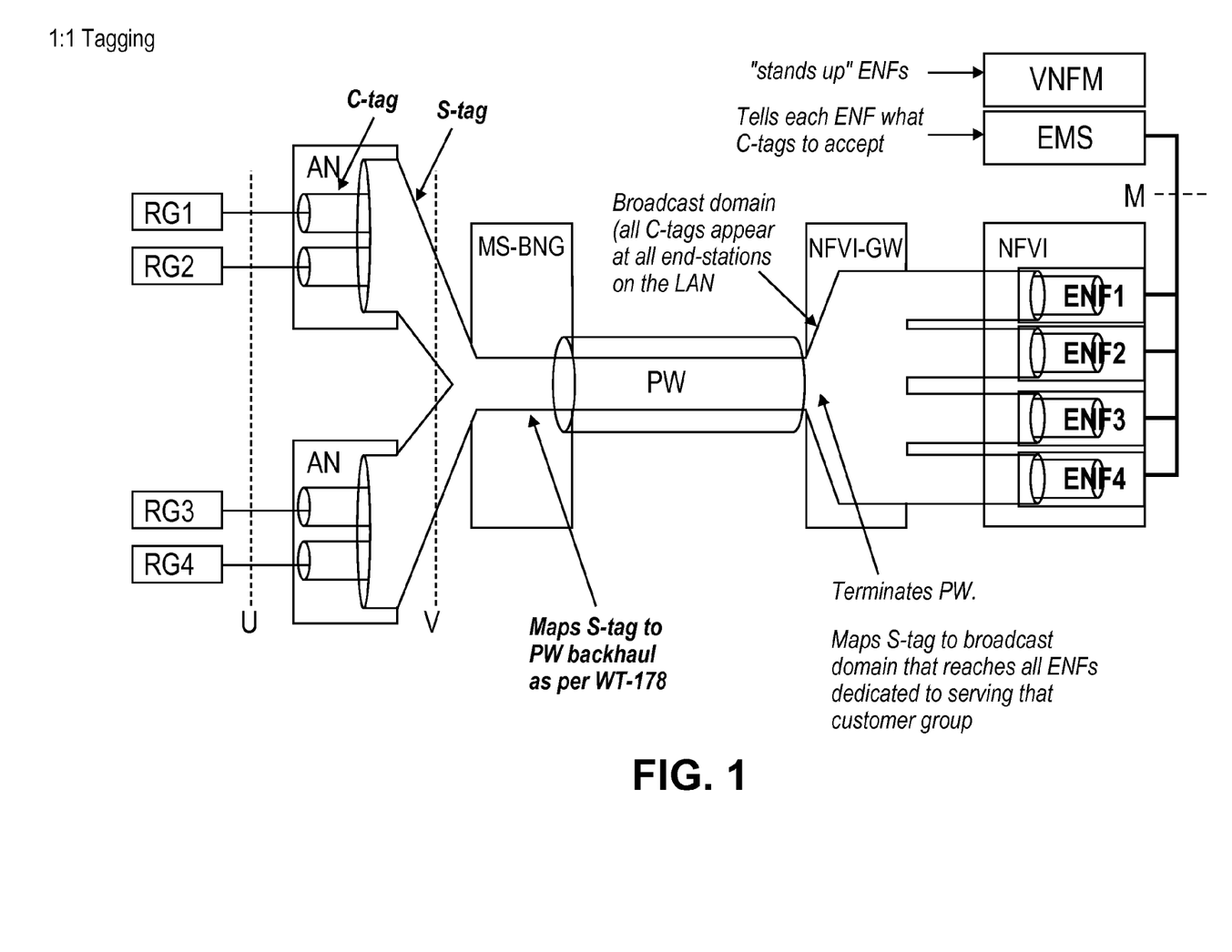
FIG. 1 is a diagram of one embodiment of an access network and NFVI where 1:1 tagging is implemented.

FIG. 1 is a diagram of one embodiment of an access network and NFVI where 1:1 tagging is implemented. In this diagram as well as those that are described herein below, an example access network and NFVI architecture are illustrated and described by way of example and not by way of limitation. One skilled in the art would understand that other configurations and methods can be utilized consistent with the principles, techniques and structures of the embodiments of the present invention.

In this example, a set of subscribers are connected to the access network through a set of residential gateways (RGs). The residential gateways are connected to the access network via a set of access nodes (ANs) that are network devices that provide initial access to the access network. The access nodes forward incoming data traffic toward the NFVI to be processed by one of a set of vENFs. In the figures, U, V and M are reference points. U is the subscriber drop. V is the uplink from the access node. M is management of the access network.

At the access nodes the data traffic is encapsulated and assigned to a virtual local area network (VLAN) according to IEEE 802.1Q, which includes the use a customer tag (C-Tag) that identifies an originating RG. The data traffic is further processed to encapsulate it and assign it to a VLAN according to a service using a service tag (S-Tag). The data traffic is then forwarded toward a multi-service border network gateway (MS-BNG) that identifies the traffic is to be serviced by the NFVI and forwards the data traffic to the NFVI gateway (NFVI GW) either as native Ethernet or tunneled via (for example) a psuedowire (PW). In one embodiment, the mapping of the data traffic can be done per S-Tag to a corresponding PW per BBF TR-178.

The NFVI GW terminate the PW and forwards the received data traffic over a broadcast domain to each of the vENFs (shown simply as ENFs in the Figures). Regardless of the tagging mode used by the AN, the S-Tags are utilized by the NFVI GW to map the data traffic to the appropriate broadcast domain that connects the NFVI GW with the set of vENFs that handle the range of services identified by the S-Tags or that serve a corresponding customer group.

The set of vENFs are managed and configured by a virtual network function manager (VNFM) and element management system (EMS). The VNFM instantiates or 'stands up' the set of vENFs and ensures the recovering and continued execution. The EMS is responsible for vENF configuration including instructing the set of vENFs with the set of C-Tags each is assigned to accept and to service the corresponding data traffic. Any method or system for assigning and distributing this configuration of C-Tags across the vENFs is encompassed by the embodiments of the invention. The assignment of C-Tags can be static or dynamic and any range including overlapping ranges of C-Tags can be assigned to each of the vENFs.

Once the data traffic reaches the set of vENFs via the broadcast domain, those vENFs assigned to the corresponding C-Tag will attempt to establish a communication session with the originating residential gateways. The resolution of which of the vENFs is successful in establishing the session where multiple vENFs attempt to establish the session can be governed at the originating RG or similarly configured. Any protocol or method can be employed for resolving multiple offers from the vENFs.

This example provides a basic overview of a 1:1 tagging embodiment. Specific implementation using PPPoE is described herein below with regard to FIGS. 2A-2C.

Figure 2A:
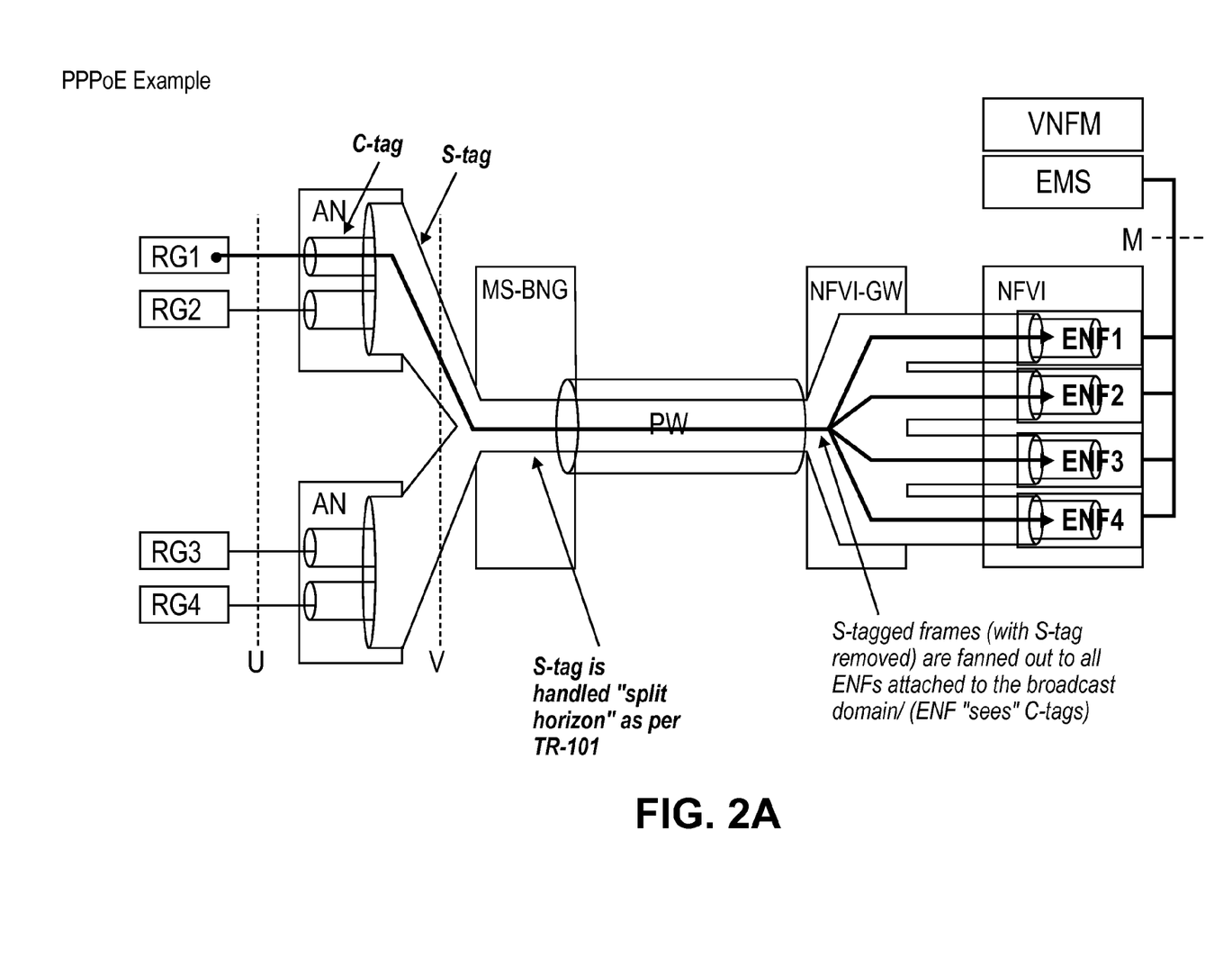
FIG. 2A is a diagram of one embodiment of an access network and NFVI where PPPoE is implemented and a PADI is sent.

FIG. 2A is a diagram of one embodiment of an access network and NFVI where PPPoE is implemented and a PADI is sent. In this embodiment, the connection to be established is a PPPoE session and the session establishment is initiated by an initial service session request from the residential gateway is implemented as a PPPoE active discovery initiation (PADI) that is sent from the residential gateway to the access node. The PADI is tagged with a C-Tag and S-Tag by the access node as per the standard and forwarded as described above. In one example embodiment, the S-Tag is handled "split horizon" as set forth in BBF TR-101 at the MS-BNG. At the NFVI GW the S-Tags are removed and the frame forwarded over the associated broadcast domain to the attached vENFs. At the vENFs, the vENFs that have been configured to service the C-Tags of the received data traffic self-select to respond and attempt to establish a PPPoE session with the residential gateway that originated the initial service session request in the form of the PADI.

Figure 2B:
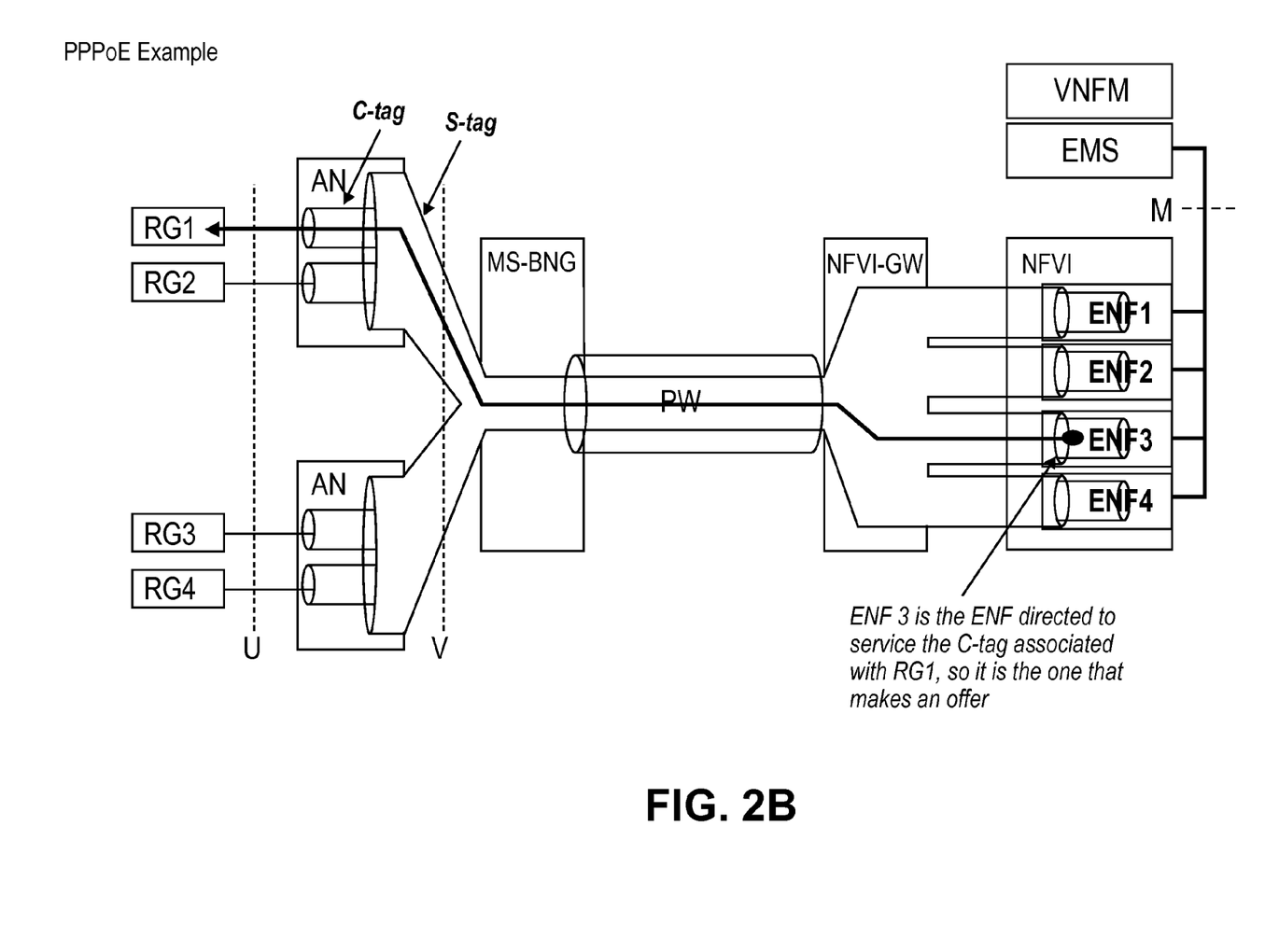
FIG. 2B is a diagram of one embodiment of an access network and NFVI where PPPoE is implemented and a PADO is sent.

FIG. 2B is a diagram of one embodiment of an access network and NFVI where PPPoE is implemented and a PADO is sent. After a subset of the vENFs have self-selected to respond to the PADI, each generates and sends a PPPoE active discovery offer to the residential gateway. The PADO contains information to identify the sending vENF such as its MAC address to enable direct communication and establishment of the PPPoE session.

Figure 2C:
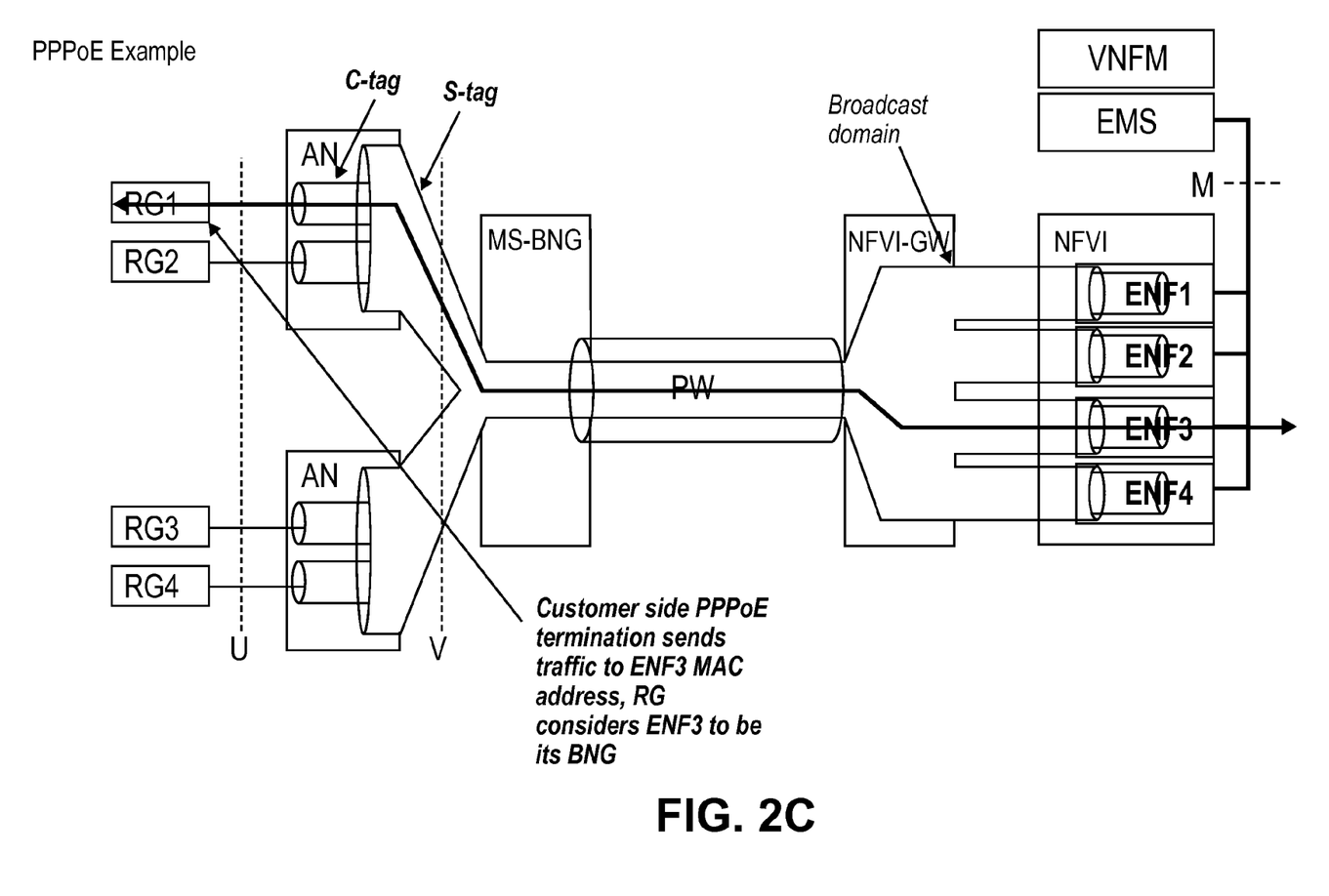
FIG. 2C is a diagram of one embodiment of an access network and NFVI where a PPPoE session is established.

FIG. 2C is a diagram of one embodiment of an access network and NFVI where a PPPoE session is established. At the originating residential gateway, the PADO from each responding vENF is received and processed. The residential gateway can use any process or mechanism for resolving which of the responding vENFs to select. The residential gateway upon resolving the vENF directs data traffic to the MAC address of the vENF and considers the vENF to its BNG and the vENF can transparently provide the edge functions expected of the BNG.

Figure 3:
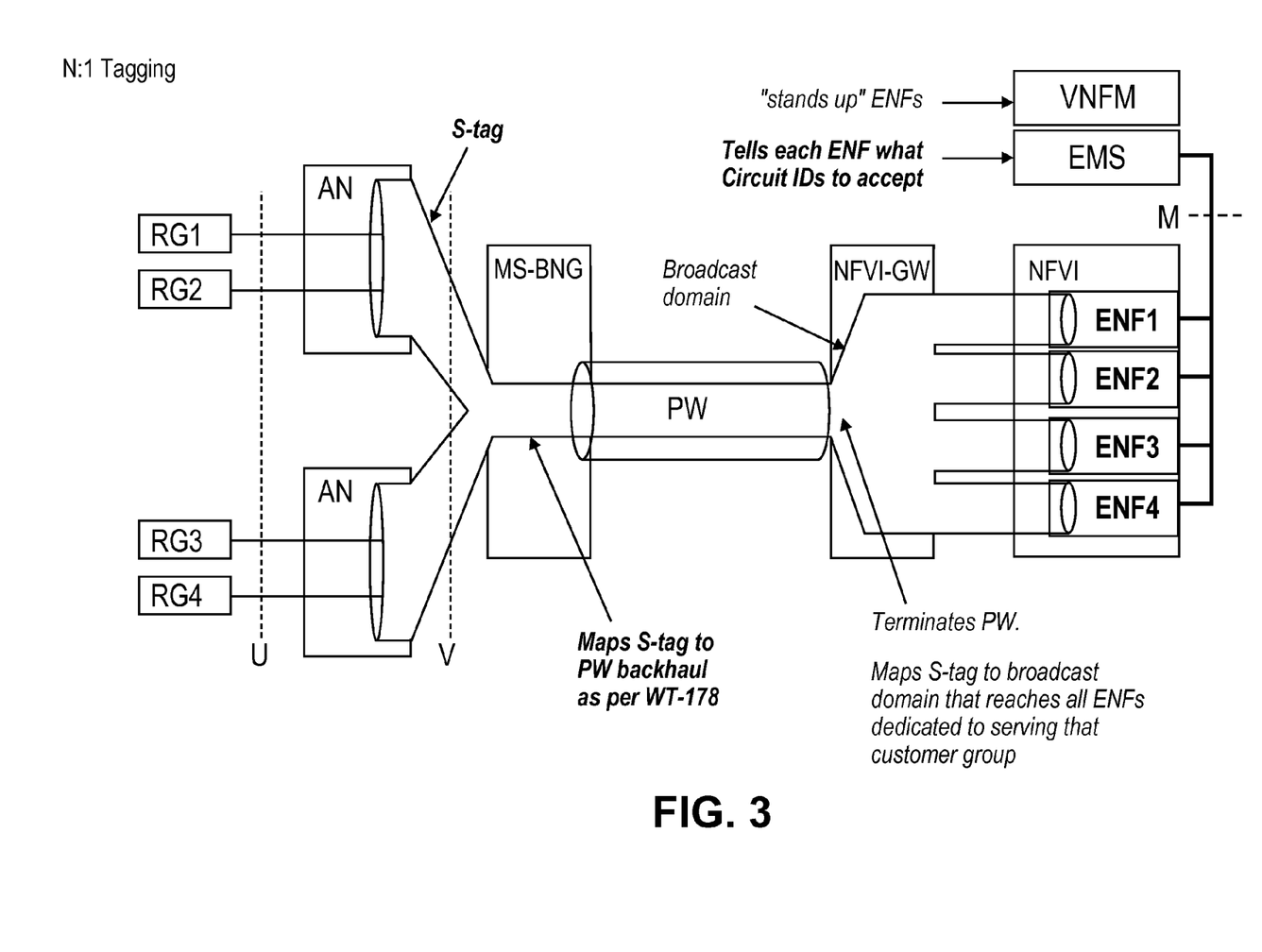
FIG. 3 is a diagram of one embodiment of an access network and NFVI where N:1 tagging is implemented.

FIG. 3 is a diagram of one embodiment of an access network and NFVI where N:1 tagging is implemented. As with FIG. 1 in this example, a set of subscribers are connected to the access network through a set of residential gateways. The residential gateways are connected to the access network via a set of access nodes that are network devices that provide initial access to the access network. The access nodes forward incoming data traffic toward the NFVI to be processed by one of a set of vENFs.

At the access nodes the data traffic is encapsulated and assigned to a virtual local area network (VLAN) according to IEEE 802.1Q, which includes assigning it to a VLAN according to a service using a service tag (S-Tag). In contrast to the embodiments described above, a C-Tag is not utilized creating an N:1 relationship between the residential gateways and the VLANs connecting them to the vENFs in the NFVI. The data traffic is then forwarded toward a multi-service border network gateway (MS-BNG) that identifies the traffic is to be serviced by the NFVI and forwards the data traffic to the NFVI gateway (NFVI GW) over a psuedowire (PW). In one embodiment, the mapping of the data traffic can be done per S-Tag to a corresponding PW per BBF WT-178.

The NFVI GW terminate the PW and forwards the received data traffic over a broadcast domain to each of the vENFs (shown simply as ENFs in the Figures). The S-Tags are utilized by the NFVI GW to map the data traffic to the appropriate broadcast domain that connects the NFVI GW with the set of vENFs that handle the range of services identified by the S-Tags or that serve a corresponding customer group.

The set of vENFs are managed and configured by a virtual network function manager (VNFM) and element management system (EMS). The VNFM instantiates or 'stands up' the set of vENFs and ensures the recovering and continued execution. The EMS is responsible for vENF configuration including instructing the set of vENFs with the set of circuit identifiers or similar facility information each is assigned to accept and to service the corresponding data traffic. Any method or system for assigning and distributing this configuration of circuit identifiers or the equivalent across the vENFs is encompassed by the embodiments of the invention. The assignment of circuit identifiers can be static or dynamic and any range including overlapping ranges of circuit identifiers can be assigned to each of the vENFs.

Once the data traffic reaches the set of vENFs via the broadcast domain, those vENFs assigned to the corresponding circuit identifiers will attempt to establish a communication session with the originating residential gateways. The resolution of which of the vENFs is successful in establishing the session where multiple vENFs attempt to establish the session can be governed at the originating RG or similarly configured. Any protocol or method can be employed for resolving multiple offers from the vENFs.

This example provides a basic overview of an N:1 tagging embodiment. Specific implementation using IPoE is described herein below with regard to FIGS. 4A-4C.

Figure 4A:
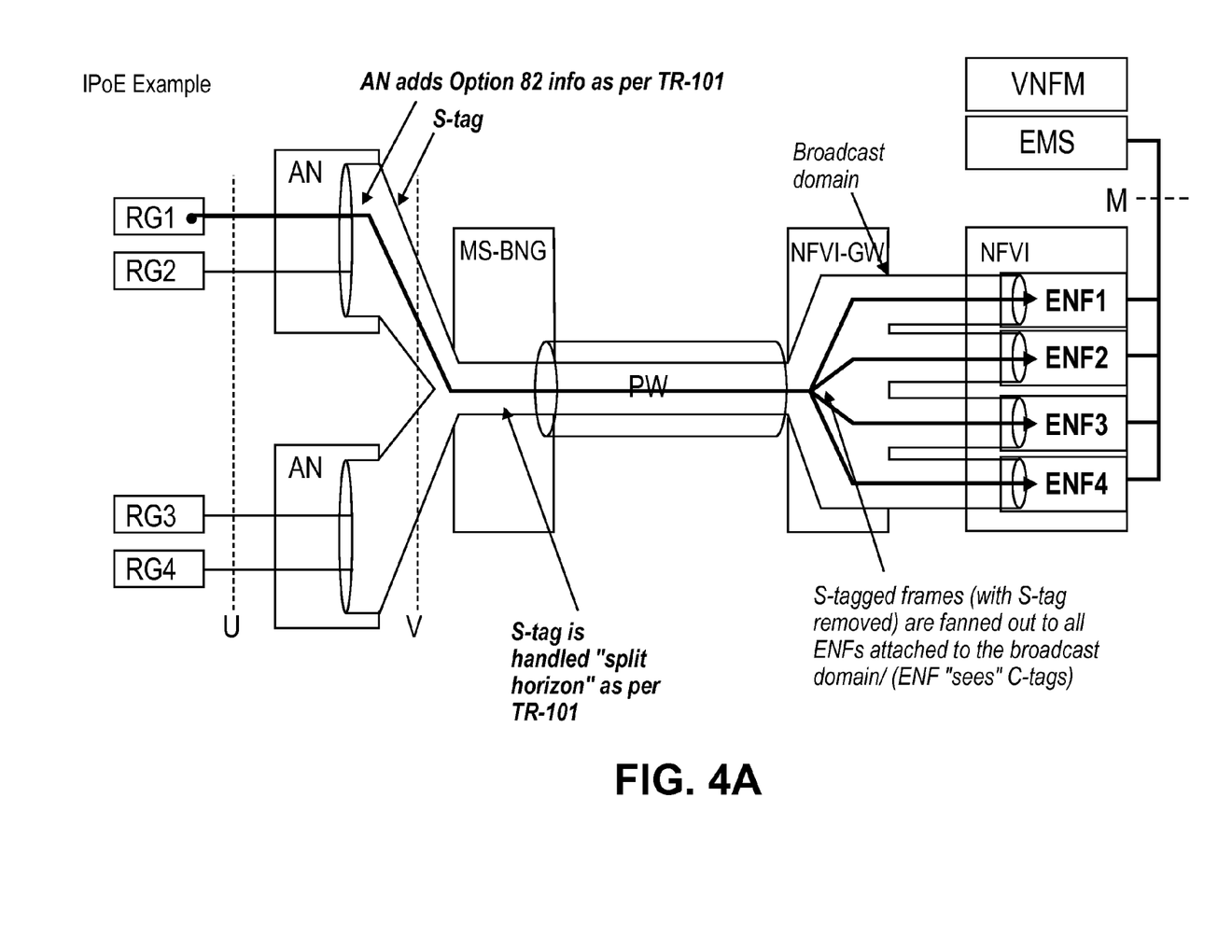
FIG. 4A is a diagram of one embodiment of an access network and NFVI where IPoE is implemented and a DHCP discover is sent.

FIG. 4A is a diagram of one embodiment of an access network and NFVI where IPoE is implemented and a DHCP discover is sent. In this embodiment, the connection to be established is an IPoE and the session to be established by an initial service session request from the residential gateway is implemented as a DHCP discovery message that is sent from the residential gateway to the access node. The DHCP discovery message is tagged and forwarded as described above with an S-Tag. In addition facility information such as a circuit identifier is added by the access node's DHCP relay agent/proxy. In one example, Option 82 information is added according to BBF TR-101. Further, in one example embodiment, the S-Tag is handled "split horizon" as set forth in BBF TR-101 at the MS-BNG. At the NFVI GW the S-Tags are removed and forwarded over the associated broadcast domain to the attached vENFs. At the vENFs, the vENFs that have been configured to service the circuit identifiers or equivalent information of the received data traffic self-select to respond and attempt to establish an IPoE session with the residential gateway that originated the initial service session request in the form of the DHCP offer message.

Figure 4B:
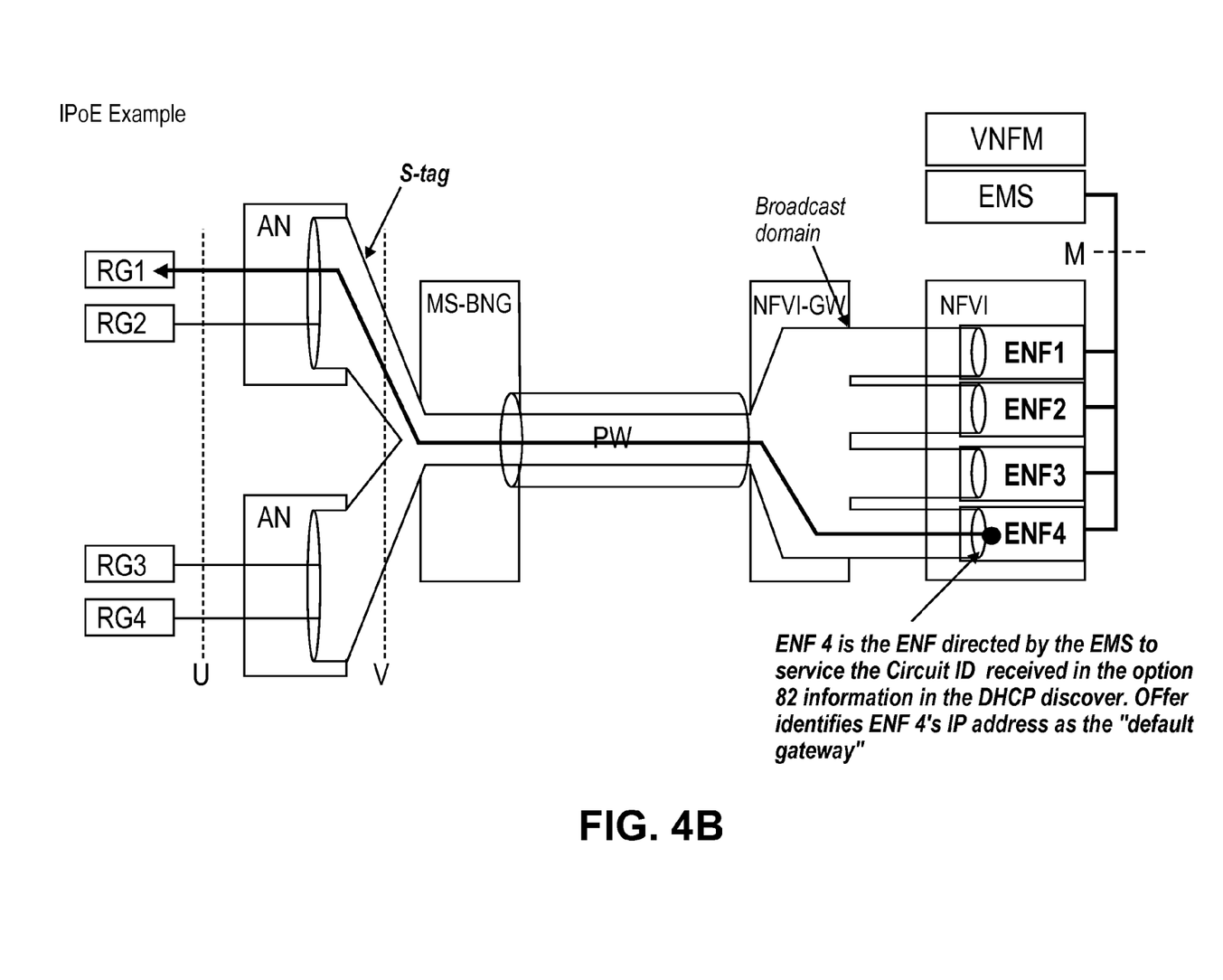
FIG. 4B is a diagram of one embodiment of an access network and NFVI where IPoE is implemented and a DHCP offer is sent.

FIG. 4B is a diagram of one embodiment of an access network and NFVI where IPoE is implemented and a DHCP offer is sent. After a subset of the vENFs have self-selected to respond to the DHCP discovery message, each generates and sends a DHCP offer to the originating gateway. The DHCP offer contains information to identify the sending vENF such as its MAC address to enable direct communication and establishment of the IPoE session.

Figure 4C:
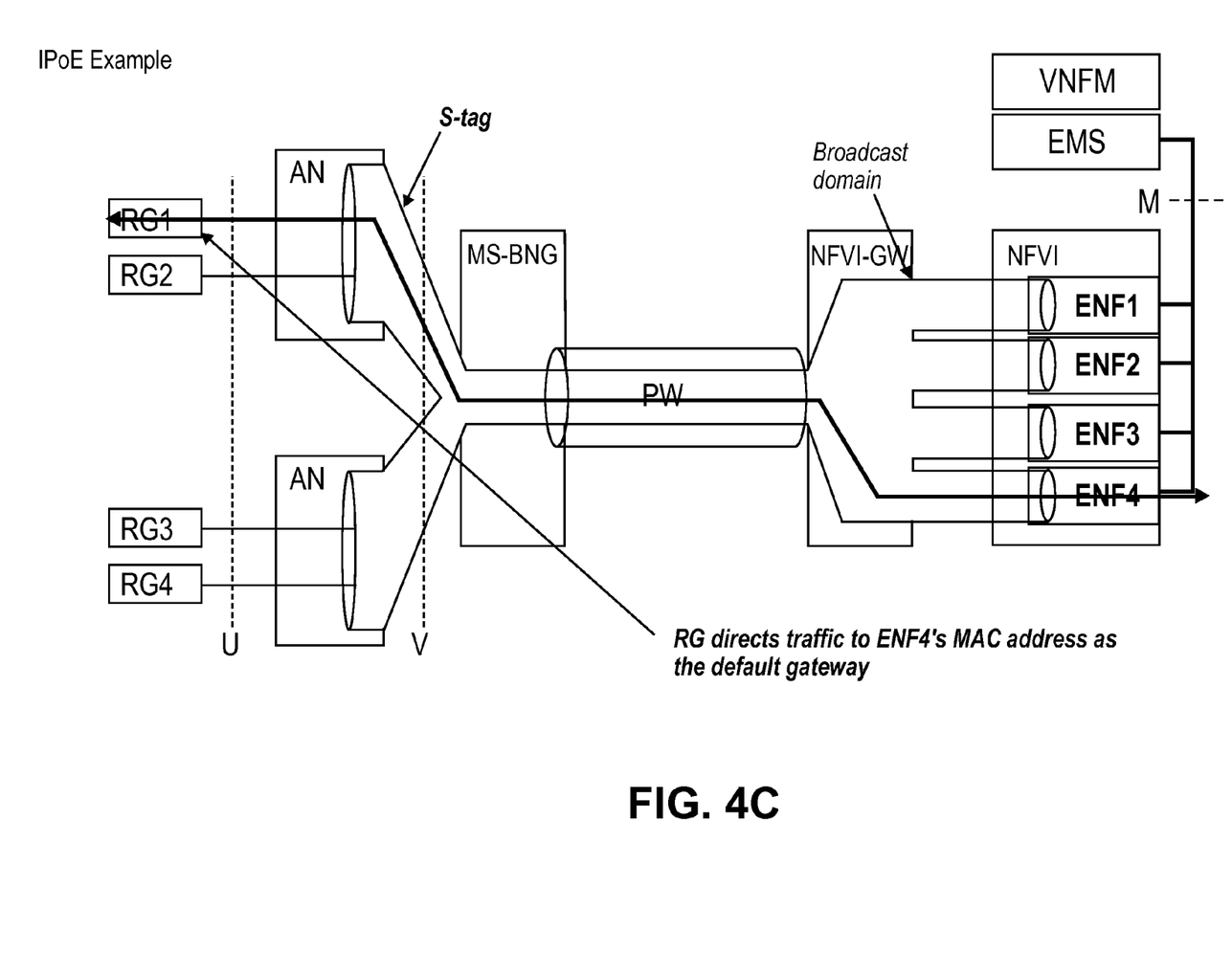
FIG. 4C is a diagram of one embodiment of an access network and NFVI where an IPoE session is established.

FIG. 4C is a diagram of one embodiment of an access network and NFVI where an IPoE session is established. At the originating residential gateway, the DHCP offer from each responding vENF is received and processed. The residential gateway can use any process or mechanism for resolving which of the responding vENFs to select. The residential gateway upon resolving the vENF directs data traffic to the MAC address of the vENF and considers the vENF to its BNG and the vENF can transparently provide the edge functions expected of the BNG.

Figure 5:
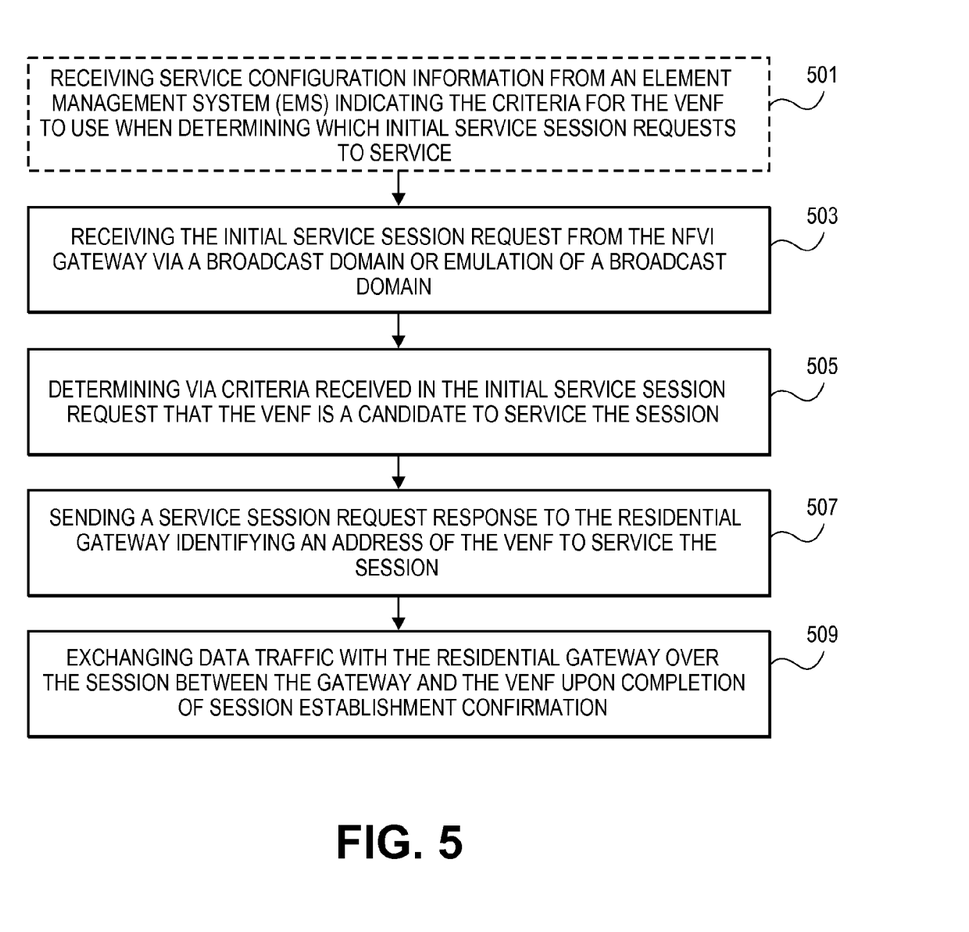
FIG. 5 is a flowchart of one embodiment of a process for vENF self-selection.

FIG. 5 is a flowchart of one embodiment of a process for vENF self-selection. This process is a generalized embodiment of the invention and encompasses the example embodiments described herein above. This is the process as implemented by each of the vENFs in an NFVI. The process begins with the instantiation of the vENFs by a VNFM (not shown). After each of the vENFs is instantiated they can each be configured by an EMS. The EMS provides a set of criteria for the vENF to utilize to identify service session requests to service (Block 501). This set of criteria dependent on the implementation can be Ethernet C-Tags, circuit identifiers, or similar facility information. vENFs can be assigned any range of criteria such that the ranges are unique or overlapping. In cases where there is overlapping criteria, then the originating residential gateways and the vENFs can employ any technique or process to negotiate which of the offering vENFs will establish a session with the originating residential gateway.

After the vENFs have been configured with the self-selection criteria, then the vENFs are prepared to receive initial service session requests from the residential gateways that are broadcast via a broadcast domain by the NFVI GW (Block 503). The initial service session requests can have any format or be specified by any protocol including being PADI or DHCP discovery messages, as discussed herein above.

Using the configured criteria, each of the vENFs evaluate the received initial service session requests to determine whether the vENF criteria indicates that the vENF is a candidate to service the requested session (Block 505). This can include checking whether the C-Tag, circuit identifier or similar information of the initial service session request match the provided criteria. If such a match is not found, then the vENF drops the traffic and does not further process the initial service session request.

However, where a match is found, then the vENF sends a service session request response to the residential gateway identifying an address of the vENF to service the session (Block 507). The response message can be a PADO, DHCP offer or similar response message. The response message can include any type of address including a MAC address, IP address or similar address that enables the residential gateway to directly communicate with the vENF. The residential gateway may receive multiple responses from vENFs in which case the residential gateway and vENFs can use any protocol or method to resolve which of the offers are accepted.

Once the residential gateway accepts an offer and completes establishment of a session with one of the vENFs, then the exchange of data traffic can start over the session between the residential gateway and the vENF with the vENF functioning as the BNG for that residential gateway.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Physical Architecture

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Certain NDs (e.g., certain edge NDs) internally represent end user devices (or sometimes customer premise equipment (CPE) such as a residential gateway (e.g., a router, modem)) using subscriber circuits. A subscriber circuit uniquely identifies within the ND a subscriber session and typically exists for the lifetime of the session. Thus, a ND typically allocates a subscriber circuit when the subscriber connects to that ND, and correspondingly de-allocates that subscriber circuit when that subscriber disconnects. Each subscriber session represents a distinguishable flow of packets communicated between the ND and an end user device (or sometimes CPE such as a residential gateway or modem) using a protocol, such as the point-to-point protocol over another protocol (PPPoX) (e.g., where X is Ethernet or Asynchronous Transfer Mode (ATM)), Ethernet, 802.1Q Virtual LAN (VLAN), Internet Protocol, or ATM). A subscriber session can be initiated using a variety of mechanisms (e.g., manual provisioning a dynamic host configuration protocol (DHCP), DHCP/client-less internet protocol service (CLIPS) or Media Access Control (MAC) address tracking) For example, the point-to-point protocol (PPP) is commonly used for digital subscriber line (DSL) services and requires installation of a PPP client that enables the subscriber to enter a username and a password, which in turn may be used to select a subscriber record. When DHCP is used (e.g., for cable modem services), a username typically is not provided; but in such situations other information (e.g., information that includes the MAC address of the hardware in the end user device (or CPE)) is provided. The use of DHCP and CLIPS on the ND captures the MAC addresses and uses these addresses to distinguish subscribers and access their subscriber records.

A virtual circuit (VC), synonymous with virtual connection and virtual channel, is a connection oriented communication service that is delivered by means of packet mode communication. Virtual circuit communication resembles circuit switching, since both are connection oriented, meaning that in both cases data is delivered in correct order, and signaling overhead is required during a connection establishment phase. Virtual circuits may exist at different layers. For example, at layer 4, a connection oriented transport layer datalink protocol such as Transmission Control Protocol (TCP) (RFC 793 and 1180) may rely on a connectionless packet switching network layer protocol such as IP, where different packets may be routed over different paths, and thus be delivered out of order. Where a reliable virtual circuit is established with TCP on top of the underlying unreliable and connectionless IP protocol, the virtual circuit is identified by the source and destination network socket address pair, i.e. the sender and receiver IP address and port number. However, a virtual circuit (RFC 1180, 955, and 1644) is possible since TCP includes segment numbering and reordering on the receiver side to prevent out-of-order delivery. Virtual circuits are also possible at Layer 3 (network layer) and Layer 2 (datalink layer); such virtual circuit protocols are based on connection oriented packet switching, meaning that data is always delivered along the same network path, i.e. through the same NEs/VNEs. In such protocols, the packets are not routed individually and complete addressing information is not provided in the header of each data packet; only a small virtual channel identifier (VCI) is required in each packet; and routing information is transferred to the NEs/VNEs during the connection establishment phase; switching only involves looking up the virtual channel identifier in a table rather than analyzing a complete address. Examples of network layer and datalink layer virtual circuit protocols, where data always is delivered over the same path: X.25, where the VC is identified by a virtual channel identifier (VCI); Frame relay, where the VC is identified by a VCI; Asynchronous Transfer Mode (ATM), where the circuit is identified by a virtual path identifier (VPI) and virtual channel identifier (VCI) pair; General Packet Radio Service (GPRS); and Multiprotocol label switching (MPLS) (RFC 3031), which can be used for IP over virtual circuits (Each circuit is identified by a label).

Figure 6:
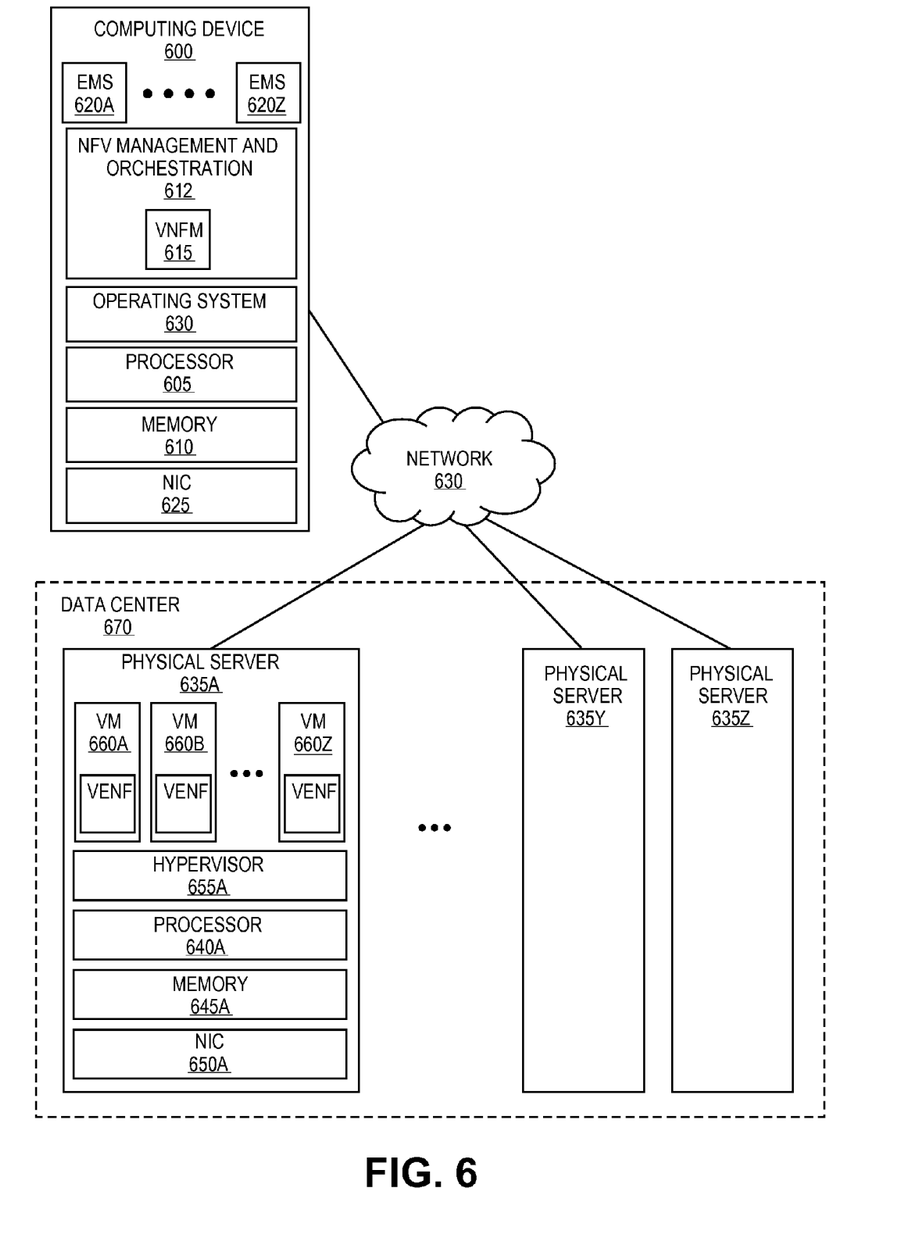
FIG. 6 is a diagram of one embodiment of a NFVI system architecture.

FIG. 6 is a diagram of one example embodiment of a NFVI system architecture. The NFVI can be implemented by a set of physical servers 635A-Z and/or individual computing devices 600. These physical servers and computing devices can be general purpose network devices that are housed in a data center 670, cloud storage center, distributed over a network or similarly physically positioned. The computing device 600 and physical servers 635A-Z includes hardware comprising a set of one or more processor(s) 605, 640A-Z (which are often COTS processors) and network interface controller(s) 625, 650A-Z (NICs; also known as network interface cards) (which include physical NIs), as well as non-transitory machine readable storage media 610, 645A-Z having stored therein software. During operation, the processor(s) 605, 640A-Z execute an operating system 630, hypervisor 655A or combination thereof. The processor(s) 605, 640A-Z can also execute the software to instantiate one or more sets of one or more applications such as the virtual machines 660A-660Z or NFV management and orchestration stack 612. The NFV management and orchestration stack 612 can include an VNFM 615, VIM, NFVO and similar components. The processor(s) 605, 640A-Z can also execute a set of EMS 620A-620Z. In the illustrated example the NFV management and orchestration stack (including the VNFM) and EMS are executed by a separate computing device 600, however, these components can also be executed by any of the physical servers 635A-Z.

The computing device 600 or physical servers 635A-Z embodiments may use different forms of virtualization— implemented in some embodiments as a virtualization layer and software container. For example, one such alternative embodiment implements operating system-level virtualization, in which case the virtualization layer includes the kernel of an operating system (or a shim executing on a base operating system) that allows for the creation of multiple software containers that may each be used to execute one of the sets of applications. In this embodiment, the multiple software containers (also called virtualization engines, virtual private servers, or jails) are each a user space instance (typically a virtual memory space); these user space instances are separate from each other and separate from the kernel space in which the operating system is run; the set of applications running in a given user space, unless explicitly allowed, cannot access the memory of the other processes. Another such alternative embodiment implements full virtualization, in which case: 1) the virtualization layer includes s a hypervisor 655A-Z (sometimes referred to as a virtual machine monitor (VMM)) or a hypervisor executing on top of a host operating system; and 2) the software containers each represent a tightly isolated form of software container called a virtual machine that is run by the hypervisor and may include a guest operating system. A virtual machine 660A-Z is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or vENFs 765A-Z can be established on respective individual virtual machines 760A-Z, as well as the virtualization layer and software containers if implemented, are collectively referred to as software instance(s). Each set of vENFs 665A-Z, corresponding virtual machines 760A-Z, software container (if implemented), and that part of the hardware that executes them (be it hardware dedicated to that execution and/or time slices of hardware temporally shared by software containers), can form a separate virtual network device(s).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented by a computing device to establish a communication session between a residential gateway and a virtual edge network function (VENF) in a network function virtualization infrastructure (NFVI) over an access network where a plurality of residential gateways are connected to the access network through a plurality of access nodes that tunnel edge network function requests to the NFVI via a NFVI gateway that broadcasts initial service requests to a plurality of VENF in the NFVI, the method comprising the steps of:
   receiving an initial service session request at the VENF from the residential gateway via the NFVI gateway and via a broadcast domain or emulation of a broadcast domain;
   determining whether VENF criteria indicates that the VENF is a candidate to service the initial service session request, where the VENF independently selects the VENF to service the initial service session request;
   sending a service session request response to the residential gateway identifying an address of the VENF to service the session; and
   exchanging data traffic with the residential gateway over the session between the gateway and the VENF upon completion of session establishment confirmation.

2. The method of claim 1, further comprising the step of: receiving service configuration information from an element management system (EMS) indicating the criteria for the VENF to use when determining which session requests to service.

3. The method of claim 1, wherein the criteria used by the VENF to self-select may include an encapsulating Ethernet C-Tag or embedded facility identification information in the service session request for data traffic to be serviced by the VENF.

4. The method of claim 1, wherein the initial service request is a point to point protocol over Ethernet (PPPoE) active discovery initiation (PADI).

5. The method of claim 1, wherein the initial service request is a dynamic host configuration protocol (DHCP) discover message.

6. The method of claim 1, wherein the service request response is a point to point over Ethernet (PPPoE) active discovery offer (PADO).

7. The method of claim 1, wherein the service request response is a dynamic host configuration protocol (DHCP) offer message.

8. A computing device implementing a residential gateway to establish a communication session between the residential gateway and a virtual edge network function (VENF) in a network function virtualization infrastructure (NFVI) over an access network where a plurality of residential gateways are connected to the access network through a plurality of access nodes that tunnel edge network function requests to the NFVI via a NFVI gateway that broadcasts initial service requests to a plurality of VENF in the NFVI, the computing device comprising:
   a non-transitory machine-readable medium having stored therein instructions for at least one virtual machine and at least one virtual edge network function (VENF);
   a processor coupled to the non-transitory machine-readable medium, the processor configured to execute the virtual machine, the at least one virtual machine configured to execute the at least one VENF, the VENF configured to receive the initial service session request from the residential gateway via the NFVI gateway and via a broadcast domain or emulation of a broadcast domain, to determine whether VENF criteria indicates that the VENF is a candidate to service the initial service session request, where the VENF independently selects the VENF to service the initial service session request, to send a service session request response to the residential gateway identifying an address of the VENF to service the session; to exchange data traffic with the residential gateway over the session between the gateway and the VENF upon completion of session establishment confirmation.

9. The computing device of claim 8, wherein the vENF is further configured to receive service configuration information from an element management system (EMS) indicating the criteria for the VENF to use when determining which session requests to service.

10. The computing device of claim 8, wherein the criteria used by the VENF to self-select may include an encapsulating Ethernet C-Tag or embedded facility identification information in the service session request for data traffic to be serviced by the VENF.

11. The computing device of claim 8, wherein the initial service request is a point to point protocol over Ethernet (PPPoE) active discovery initiation (PADI).

12. The computing device of claim 8, wherein the initial service request is a dynamic host configuration protocol (DHCP) discover message.

13. The computing device of claim 8, wherein the service request response is a point to point over Ethernet (PPPoE) active discovery offer (PADO).

14. The computing device of claim 8, wherein the service request response is a dynamic host configuration protocol (DHCP) offer message.

\* \* \* \* \*